United States Patent
Loiler et al.

(10) Patent No.: US 7,849,336 B1
(45) Date of Patent: Dec. 7, 2010

(54) BOOST VOLTAGE GENERATION

(75) Inventors: Brian Roger Loiler, Soquel, CA (US);
Ludger Mimberg, San Jose, CA (US);
Srikanth Lakshmikanthan, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 691 days.

(21) Appl. No.: 11/736,524

(22) Filed: Apr. 17, 2007

(51) Int. Cl.
*G06F 1/00* (2006.01)
*G06F 1/26* (2006.01)
*G05F 3/02* (2006.01)

(52) U.S. Cl. .................. 713/300; 713/320; 327/536; 327/537

(58) Field of Classification Search .............. 713/300, 713/320; 327/536, 537
See application file for complete search history.

(56) References Cited

U.S. PATENT DOCUMENTS

| 5,028,811 | A | * | 7/1991 | Le Roux et al. | 327/110 |
| 5,650,741 | A | * | 7/1997 | Nakamura et al. | 327/327 |
| 2002/0053942 | A1 | * | 5/2002 | Tanimoto | 327/536 |
| 2002/0145893 | A1 | * | 10/2002 | Yamamoto | 363/59 |
| 2005/0068705 | A1 | * | 3/2005 | Nakahara | 361/100 |
| 2008/0169863 | A1 | * | 7/2008 | Fukami | 327/536 |

* cited by examiner

*Primary Examiner*—Vincent T Tran
(74) *Attorney, Agent, or Firm*—Berkeley Law & Technology Group, LLP

(57) ABSTRACT

Embodiments for generating a boost voltage in a computing platform are disclosed.

20 Claims, 6 Drawing Sheets

BOOST VOLTAGE GENERATION

BACKGROUND

This disclosure is related to generating a boost voltage for a power supply switch.

As computing systems become more and more complex and powerful, providing adequate power to various computing system components becomes an important issue. In some instances, computing system components may be installed in slot connectors. For example, for some computing platforms, a graphics card may be installed in an advanced graphics port (AGP) bus slot connector or a peripheral component interconnect (PCI) express bus slot connector. The graphics card may receive power through the slot connector. However, the amount of power that can be delivered via the graphics card's edge connector may be limited, thus restricting the amount of power available to a graphics processing unit (GPU). Thus, alternative means for delivering power to computing system components, such as graphics cards, are desirable.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference to the following detailed description if read with the accompanying drawings in which:

DETAILED DESCRIPTION

Figure 1:
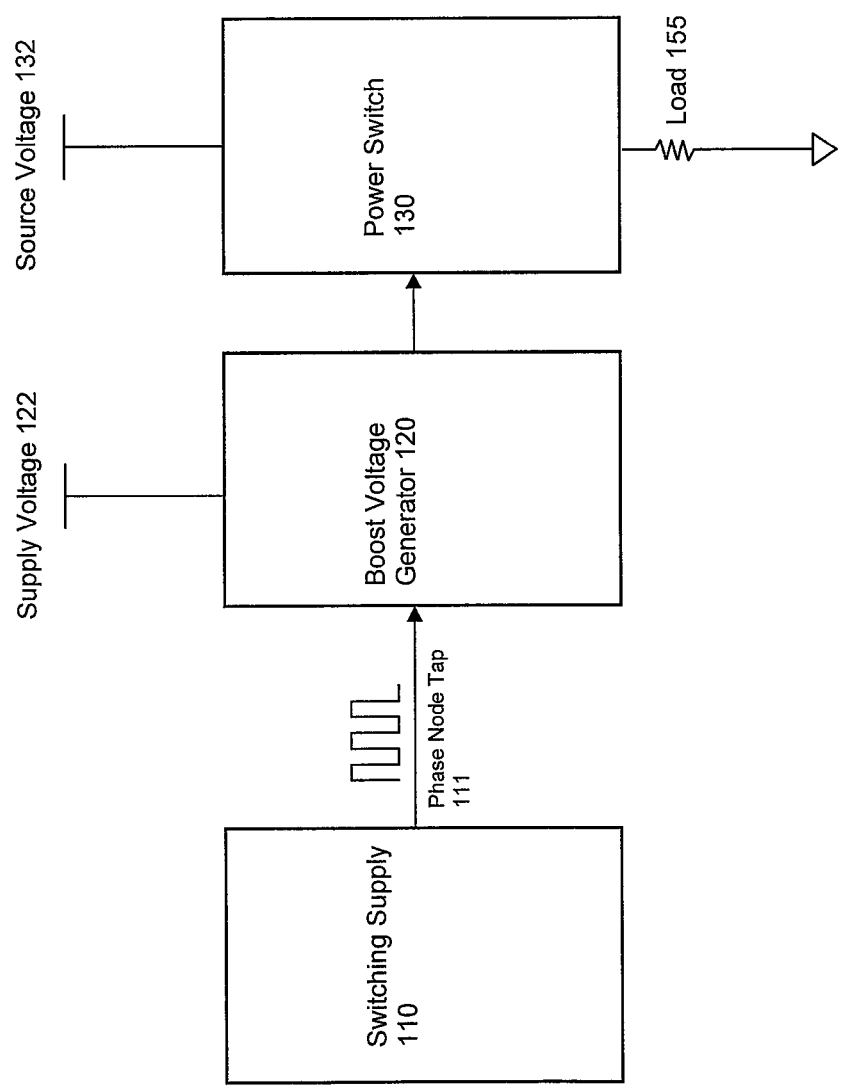
FIG. 1 is a block diagram of an example embodiment of a boost voltage generator circuit coupled to a power switch.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

As described above, it may be desirable to provide alternate means for delivering power to computing system components. One example of such a computing system component may include a graphics card, although the claimed subject matter is not limited in this respect. A graphics card may comprise a graphics processing unit (GPU) that may require more power than can be supplied via a slot connector. For example, for a PCI Express slot, a total of approximately 75 W may be received through the slot connector. If a GPU needs more power, the power may be gathered from a different source. For one example, additional power may be received directly from a computer system's main power supply via a cable coupled directly between the main power supply and a connector on the graphics card. In some embodiments, an additional 75 W may be available from the main power supply.

For some embodiments, the amount of power available from the slot connector and the main power supply may not be sufficient. In such a case, additional power may be received via an auxiliary power supply that may be located external to the computer platform. In one embodiment, an auxiliary power cable may be coupled between the auxiliary power supply and an auxiliary power connector on the graphics card.

As can be seen, more than one source of power may be available to a GPU and other components on a graphics card. In order to allow a plurality of power sources to supply a GPU, for example, means may be provided whereby the plurality of power sources are each able to deliver power to the GPU. A switch or a series of switches may be provided to control power delivery to the graphics card components, such as the GPU.

For one or more embodiments, the voltage signals received from the main power supply and/or the auxiliary power supply may comprise 12 V signals. The slot connector for one embodiment may also provide a 12 V voltage signal. 3.3 V and/or 5 V voltage signals may also be provided through the slot connector.

For switching among 12 V sources in this example, n-channel metal oxide semiconductor field-effect transistors (MOSFET) may be utilized. However, if a 12 V signal at a source node of an n-channel MOSFET is to be applied to a load (perhaps a GPU) coupled to a drain node of the n-channel MOSFET, a voltage of greater than 12 V must be applied to a gate node of the n-channel MOSFET in order to turn on the MOSFET. N-channel MOSFET devices may be more desirable in this application than p-channel MOSFET devices due in part to the n-channel device's lower resistance between the source and drain nodes when fully conducting. This may result in a lower voltage drop across the transistor and may also result in less power loss in the transistor.

However, a difficulty arises in using n-channel MOSFETs to switch among various 12 V sources due to the need for a voltage greater than 12 V to be applied to the gate node of the n-channel MOSFET to turn the MOSFET on. The embodiments disclosed below describe one example technique for providing a voltage sufficient to turn on the n-channel MOSFET using inexpensive parts and/or devices that already typically exist on a graphics card. Thus, the benefits of using n-channel MOSFET devices may be obtained without significant cost.

Although the embodiments described herein discuss graphics cards, other embodiments are possible where the techniques disclosed herein are used for other types of electronic devices and/or computer system components.

FIG. 1 is a block diagram of an example embodiment of a boost voltage generator circuit 120 coupled to a power switch 130. For one embodiment, power switch 130 may comprise an n-channel MOSFET. Power switch 130, when enabled, couples a source voltage 132 to a load 155. For this example, source voltage 132 may comprise a 12 V signal and load 155 may comprise a GPU. Boost voltage generator 120 receives a supply voltage 122, and also receives a signal from a switching power supply 110. The signal from switching supply 110 is derived from a phase node within the switching power supply. Because graphics cards typically include a switching power supply, little or no extra cost is incurred in utilizing the switching power supply to deliver a phase node tap signal 111 to boost voltage generator 120. For this example, supply voltage 122 comprises a 12 V signal, and switching supply 110 comprises a 12 V power supply. Boost voltage generator may utilize supply voltage 122 and phase node tap signal 111 to create a signal with a voltage level sufficient to enable power switch 130. For this example, a signal of approximately 17-18 V is provided to power switch 130 from boost voltage generator 120.

Figure 2:
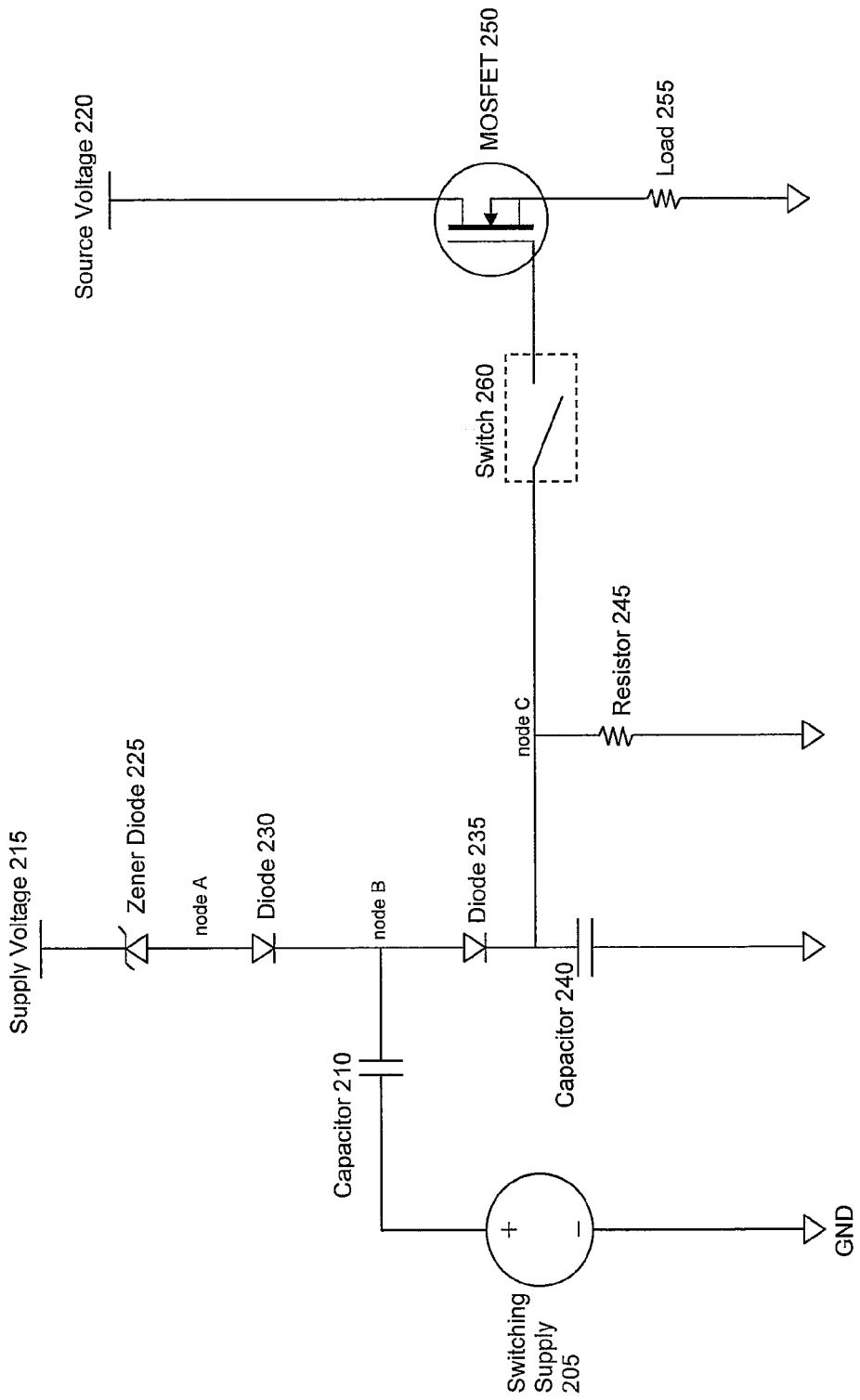
FIG. 2 is a schematic diagram of an example embodiment of a boost voltage generator circuit coupled to a transistor.

FIG. 2 is a schematic diagram of an example embodiment of a boost voltage generator circuit coupled to an n-channel MOSFET 250. For this embodiment, the boost voltage generator circuit comprises a capacitor 210, a zener diode 225, diodes 230 and 235, a capacitor 240, and a resistor 245. For this embodiment, capacitor 210 has a value of approximately 0.1 pF and capacitor 240 has a value of approximately 0.47 pF. However, the scope of the claimed subject matter is not limited in these respects.

A switching power supply 205 is coupled through capacitor 210 to a node B defined by the cathode of diode 230 and the anode of diode 235. The signal from the switching supply 205 may be derived from a phase node of the switching supply. Zener diode 225 for this example is situation between the anode of diode 230 and a supply voltage 215.

For this example, supply voltage 215 may comprise a 12 V voltage signal which may be derived from any of a number of sources. For example, supply voltage 215 may be derived from a supply voltage delivered through a slot connector, although the scope of the claimed subject matter is not limited in this respect.

For this example, zener diode 225 may allow for a voltage drop of approximately 5.1 V across the terminals of the zener diode. Thus, when 1.2 V is supplied by supply voltage 215, a voltage of approximately 6.9 V may be observed at node A. Node A for this example is defined by the anode of zener diode 225 and the anode of diode 230. An additional voltage drop of approximately 0.7V may occur across the terminals of diode 230, resulting for this example in a voltage of approximately 6.2 V at node B. As additional voltage is supplied at node B by switching supply 205, the voltage at node B rises to approximately 18.2 V. Diode 230 prevents current from flowing from node B to node A.

An additional voltage drop may be observed across diode 235, resulting in this example in a voltage of approximately 17.5 V. Capacitor 240 and resistor 245 are coupled between node C and ground. Node C for this example is defined by the cathode of diode 235, capacitor 240, and resistor 245. Capacitor 240 and resistor 245 form a filter for the voltage present at node C, thereby reducing voltage fluctuations that may otherwise be introduced by the pulsing voltage delivered by switching supply 205.

When the approximately 17.5 V is applied to the gate of MOSFET 250, MOSFET 250 is "turned on", or conducting, and source voltage 220 is applied to load 255, minus a small voltage drop across MOSFET 250. For this example, source voltage 220 may comprise an approximately 12 V signal, which may be derived from a voltage signal received from a main power supply or from an auxiliary power supply. Of course, these are merely examples of sources for voltage signal 220, and the scope of the claimed subject matter is not limited in this respect. The load for this example may comprise a GPU, although again the scope of the claimed subject matter is not limited in this respect. The 17.5 V signal applied to the gate of MOSFET 250 is sufficient to enable the n-channel MOSFET 250, thereby coupling source voltage 220 to load 255.

A switching circuit, represented by switch 260 in the present example, may be implemented to control when the boost voltage at node C is applied to MOSFET 250.

Figure 3:
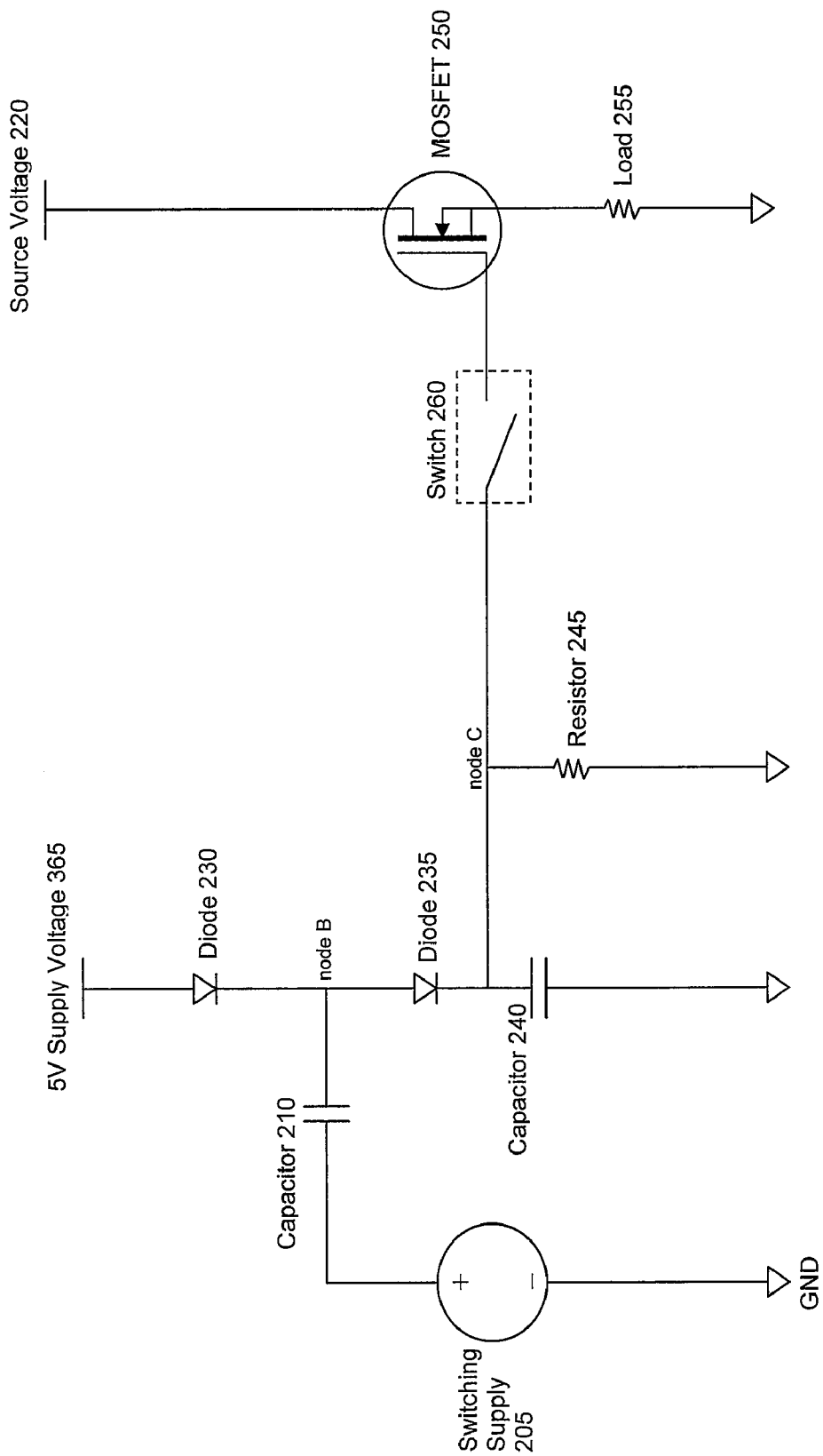
FIG. 3 is a schematic diagram of an alternate example embodiment of a boost voltage generator circuit coupled to a transistor.

FIG. 3 is a schematic diagram of an alternate example embodiment of a boost voltage generator circuit coupled to a transistor. This example embodiment is similar in most respects to the example discussed above in connection with FIG. 2. For this example, zener diode 225 has been eliminated. This is possible due to the lower supply voltage applied to the anode of diode 230. For this example, supply voltage 365 comprises a voltage signal having a voltage level of approximately 5 V. As a result of the voltage drop across diode 230, a voltage of approximately 4.3 V may be present at node B. When the phase node output of switching supply 205 is received at node B, the voltage on that node may reach approximately 16.3 V. Due to the voltage drop across diode 235, the voltage on node C may be approximately 15.6 V, which is sufficient to enable MOSFET 250 if switching circuit 260 is closed.

For this example embodiment, the 5 V supply voltage 365 may be derived from a voltage signal received by a graphics card at a slot connector. Of course, the scope of the claimed subject matter is not limited in this respect.

Figure 4:
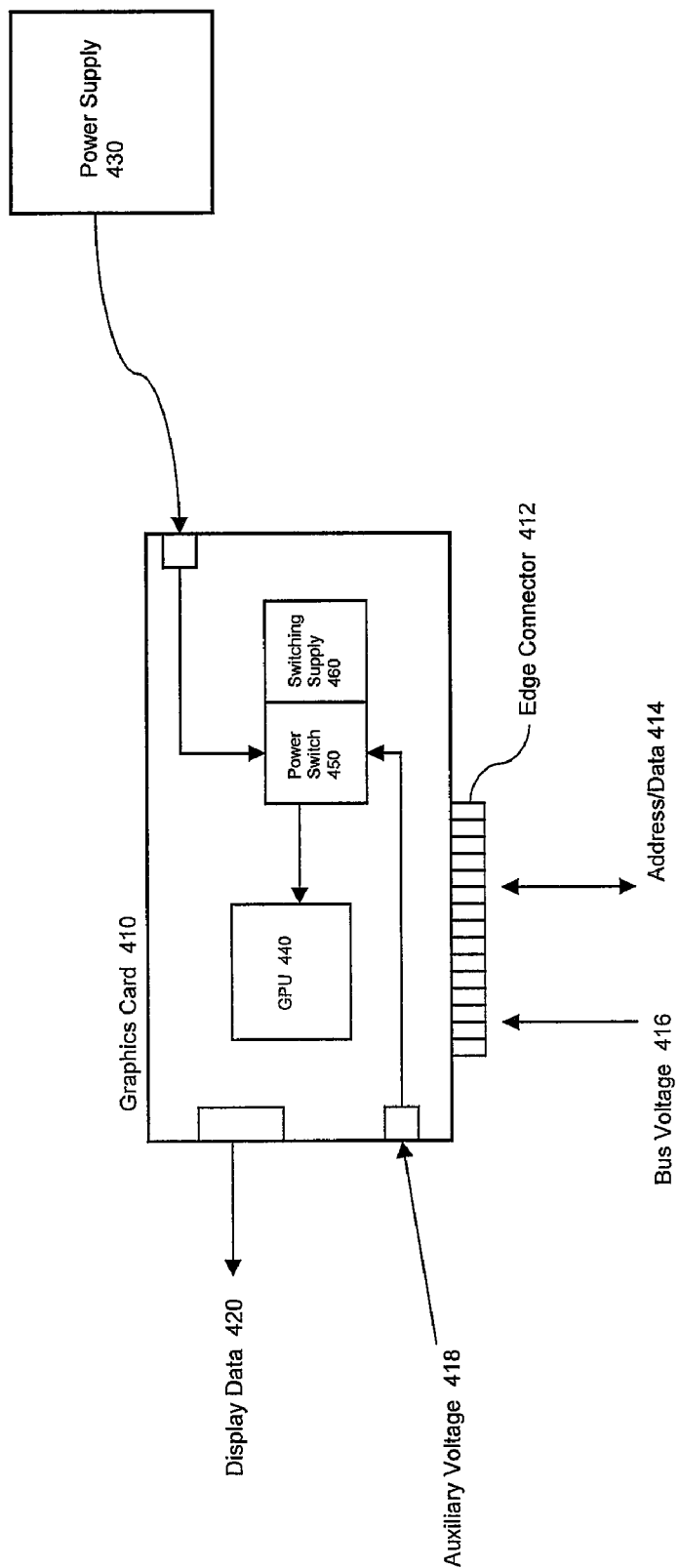
FIG. 4 is a block diagram of an example embodiment of a graphics card comprising a boost voltage generator circuit and a power switch capable of switching among two or more supply voltages.

FIG. 4 is a block diagram of an example embodiment of a graphics card 410 comprising a boost voltage generator circuit incorporated into a power switch circuit 450 capable of switching among two or more supply voltages and further capable of delivering power to a GPU 440.

In general, a graphics card such as card 410 is installed in a bus slot on a computing platform motherboard. A graphics card may receive graphics and/or video related address and data information via an edge connector, such as connector 412 in the present example. The graphics card may then generate display data that may be output to a display device, such as a flat panel display, for example. For this example, address and data information may be received via address/data lines 414. Edge connector 412 may also provide a connection for one or more power signals, such as bus voltage 416 for this example. Display data may be output via a display data signal 420.

Graphics card 410 may comprise a switching supply 460, as well as an auxiliary voltage input 418 and a connector that can accommodate voltage received from a power supply 430 that may be mounted within a computer system chassis. Power supply 430 may comprise a computing platform's main power supply.

For this example, power switch 450 may receive power from bus voltage 416, power supply 430, and/or voltage from auxiliary voltage 418. Power switch 450 may select from and/or combine any combination of the afore-mentioned voltage sources to provide power for GPU 440. One or more n-channel MOSFET devices may be included in power switch 450, and the power switch may incorporate a boost voltage generator circuit such as those disclosed above in connection with FIGS. 1 through 3. The boost generator circuit within power switch 450 may utilize a phase node signal from switching supply 460 to generate a voltage sufficient to enable one or more n-channel MOSFETs within power switch 450.

The example embodiment of a graphics card depicted in FIG. 4 and described above is merely an example. Many variations are possible within the scope of the claimed subject matter. Also, as mentioned earlier, although the embodiments described herein disclose GPUs, the boost voltage generation and voltage switching aspects of the embodiments described herein may be implemented in any of a number of other electronic device types and/or computing platform components.

Figure 5:
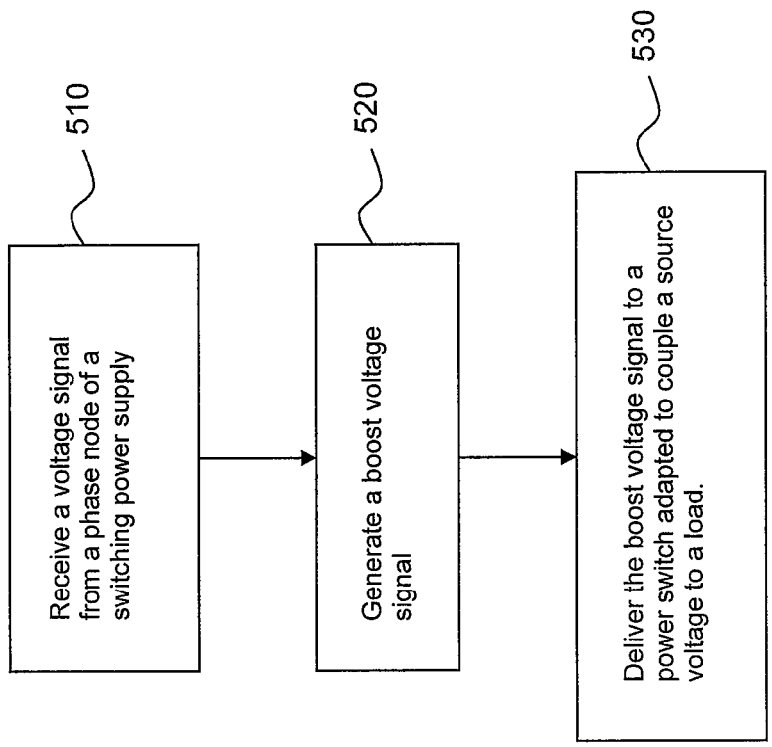
FIG. 5 is a flow diagram of an example embodiment of a method for generating a boost voltage.

FIG. 5 is a flow diagram of an example embodiment of a method for generating a boost voltage. At block 510, a voltage signal is received from a phase node of a switching power supply. At block 520, a boost voltage signal is generated. At block 530, the boost voltage signal is delivered to a power switch adapted to couple a source voltage to a load. For one embodiment, the method may be implemented in accordance with the embodiments discussed above in connection with FIGS. 1 through 3. An embodiment in accordance with claimed subject matter may include all, more than all or less than all of blocks 510-530. Furthermore, the order of blocks 510-530 is merely one example order, and the scope of the claimed subject matter is not limited in this respect.

Figure 6:
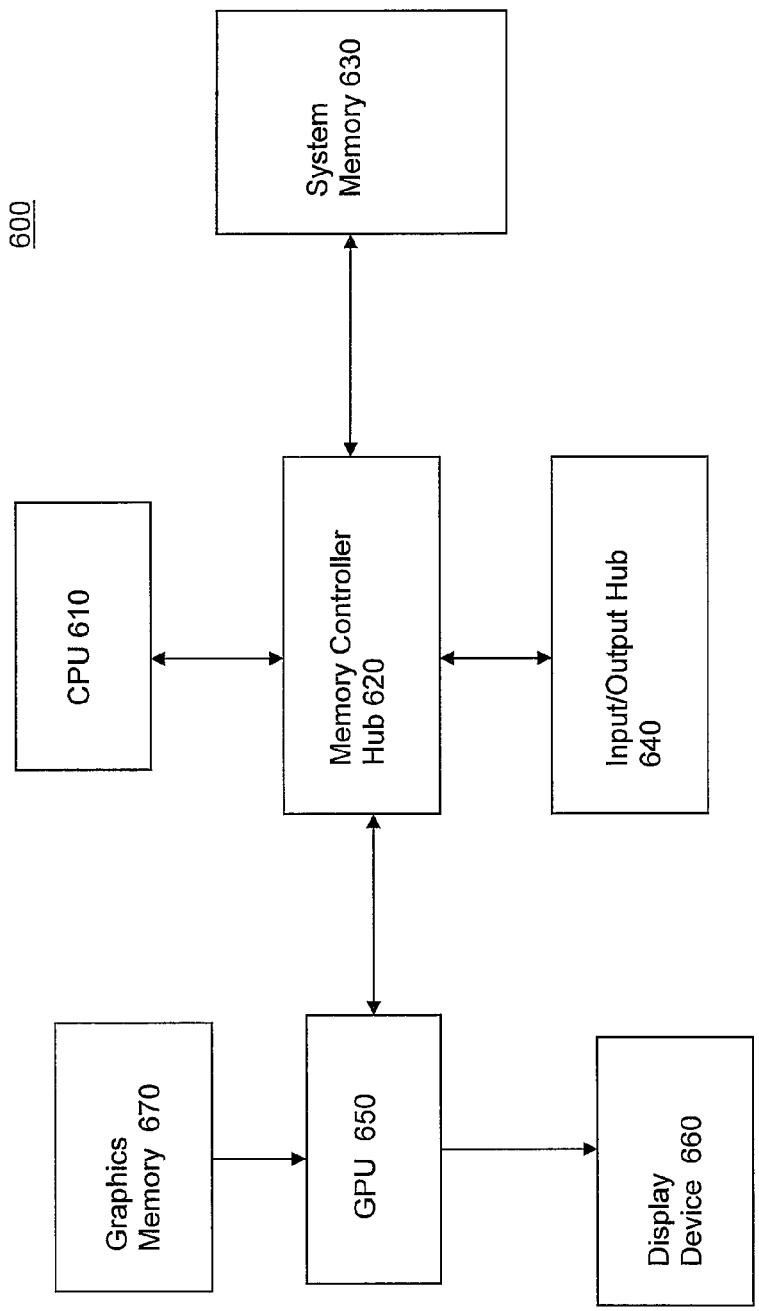
FIG. 6 is a block diagram of an example embodiment of a computing platform.

FIG. 6 is a block diagram of an example embodiment of a computing platform 600. Computing platform 600 includes a central processing unit (CPU) 610 and a memory controller hub 620 coupled to CPU 610. Memory controller hub 620 is further coupled to a system memory 630, to a GPU 650, and to an input/output hub 640. GPU 650 is further coupled to a display device 660, which may comprise a cathode ray tube (CRT) display, a flat panel liquid crystal display (LCD), or other type of display device. Also coupled to GPU 650 is a graphics memory 670. For this example embodiment, graphics memory 670 and GPU 650 may be located on a graphics card. The graphics card may comprise boost voltage generation circuitry similar to that discussed above in connection with FIGS. 1 through 5. For other embodiments, graphics components and/or boost voltage circuitry may be located on a computer motherboard, or on a range of other electronic devices and/or components.

Although example system 600 is shown with a particular configuration of components, other embodiments are possible using any of a wide range of configurations. Further, the example embodiments described herein may be utilized in any of a wide range of electronic devices, including, but not limited to, computing platforms, gaming consoles and devices, cellular phones, personal digital assistants, music players, communications network components, etc.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. An apparatus, comprising:
    a boost voltage generator circuit to receive a voltage signal from a phase node of a switching power supply and to receive a supply voltage; and
    a power switch coupled to an output of the boost voltage generator, the power switch to couple a source voltage to a load, the boost voltage generator circuit to generate a voltage having a level exceeding that of the source voltage and that of the supply voltage.

2. The apparatus of claim 1, wherein the power switch comprises an n-channel metal-oxide semiconductor field effect transistor (MOSFET).

3. The apparatus of claim 2, further comprising a switching circuit to selectively couple the output of the boost voltage generator circuit to the n-channel MOSFET.

4. The apparatus of claim 1, the power switch to couple the source voltage and an auxiliary voltage to the load.

5. The apparatus of claim 4, wherein the auxiliary voltage comprises a voltage received from a power supply external to a computer system.

6. The apparatus of claim 1, wherein the source voltage comprises a voltage level of approximately 12 V.

7. The apparatus of claim 1, wherein the supply voltage comprises a voltage level of approximately 12 V.

8. The apparatus of claim 1, wherein the supply voltage comprises a voltage level of approximately 5 V.

9. The apparatus of claim 1, wherein the switching power supply, the boost voltage generator, and the power switch are located on a graphics card.

10. The apparatus of claim 1, wherein the load comprises a graphics processor unit.

11. The apparatus of claim 1, wherein the source voltage comprises a voltage received from a main power supply of a computer system.

12. A method, comprising:
receiving a voltage signal from a phase node of a switching power supply at a boost voltage generator circuit;
receiving a supply voltage at the boost voltage generator circuit;
generating, using the boost voltage generator circuit, a boost voltage signal based at least in part on the voltage signal from the phase node of the switching power supply and based at least in part on the supply voltage; and
coupling, using a power switch, a source voltage to a load at least in part in response to receiving the boost voltage signal at the power switch, the boost voltage signal having a level exceeding that of the source voltage and that of the supply voltage.

13. The method of claim 12, wherein said receiving the boost voltage signal at the power switch comprises receiving the boost voltage signal at an n-channel metal-oxide semiconductor field effect transistor (MOSFET).

14. The method of claim 12, further comprising coupling, using the power switch, an auxiliary voltage to the load at least in part in response to receiving the boost voltage signal at the power switch.

15. The method of claim 14, wherein the source voltage comprises a voltage received from a main power supply of a computer system, and wherein the auxiliary voltage comprises a voltage received from a power supply external to the computer system.

16. An apparatus, comprising:
means for generating a boost voltage signal based at least in part on a voltage signal from a phase node of a switching power supply and based at least in part on a supply voltage; and
means for coupling a source voltage to a load at least in part in response to receiving the boost voltage signal at said means for coupling, the boost voltage signal having a level exceeding that of the source voltage and that of the supply voltage.

17. The apparatus of claim 16, further comprising means for filtering the boost voltage signal.

18. The apparatus of claim 16, wherein the source voltage comprises a voltage received from a main power supply of a computer system, and wherein the supply voltage comprises a voltage received from a slot connector.

19. The apparatus of claim 16, further comprising means for coupling an auxiliary voltage to the load at least in part in response to receiving the boost voltage signal.

20. The apparatus of claim 19, wherein said means for generating the boost voltage signal and said means for coupling the source voltage are located on a graphics card to be installed in a computer system, and wherein the auxiliary voltage comprises a voltage from a power supply external to the computer system.

* * * * *